United States Patent [19]

Gravely

[11] Patent Number: 5,430,807
[45] Date of Patent: Jul. 4, 1995

[54] VARIABLE MAGNIFICATION COLOR SCANNING LIGHT MICROSCOPE

[75] Inventor: Benjamin T. Gravely, Raleigh, N.C.

[73] Assignee: Gravely Research Corporation, Raleigh, N.C.

[21] Appl. No.: 990,030

[22] Filed: Dec. 14, 1992

[51] Int. Cl.⁶ .............................................. H04N 5/30
[52] U.S. Cl. .................... 382/128; 382/322; 348/79
[58] Field of Search .............. 382/1, 6, 65, 66; 356/39; 364/413.08, 413.13; 359/385; 348/79

[56] References Cited

U.S. PATENT DOCUMENTS

| | | | |
|---|---|---|---|
| 2,671,128 | 3/1954 | Zworykin et al. | 178/5.2 |
| 3,315,229 | 4/1967 | Smithline | 340/146.3 |
| 3,593,284 | 7/1971 | Frank | 382/66 |
| 3,819,913 | 6/1974 | Carter et al. | 235/92 PC |
| 3,827,804 | 8/1974 | Miller et al. | 356/39 |
| 3,873,974 | 3/1975 | Boulton et al. | 340/146.3 |
| 3,908,078 | 9/1975 | Auerbach et al. | 178/6.8 |
| 4,012,634 | 3/1977 | Boulton et al. | 250/201 |
| 4,045,772 | 8/1977 | Boulton et al. | 340/146.3 |
| 4,048,616 | 9/1977 | Hart et al. | 382/6 |
| 4,307,376 | 12/1981 | Miller et al. | 340/146.3 |
| 4,549,204 | 10/1985 | Bertero et al. | 358/93 |
| 4,702,595 | 10/1987 | Mutschler et al. | 356/39 |
| 4,806,015 | 2/1989 | Cottingham | 356/335 |
| 5,032,720 | 7/1991 | White | 250/236 |
| 5,161,053 | 11/1992 | Dabbs | 359/384 |

OTHER PUBLICATIONS

Wilson, "Scanning Optical Microscopy" IEEE Electrotechnology Review, vol. 2, pp. 101-103, 1986.
Hecht, "Optics", Addison Wesley Co. 1987 pp. 128-129.
"The Scanning Optical Microscope", T. Wilson IEE DN A79021809 26pages, 1978.

Primary Examiner—Michael T. Razavi
Assistant Examiner—Larry J. Prikockis
Attorney, Agent, or Firm—Rosenthal & Putterman

[57] ABSTRACT

An improved imaging system operates at the diffraction limit of the optics to which it is connected and outputs a signal representative of the sample lying in the sample plane. The imaging system comprises a cathode ray tube, an optical lens system and a means for sensing. The cathode ray tube comprises an electron gun for generating an electron beam in a raster pattern. The raster pattern comprises a predetermined number of horizontal lines that are spaced vertically from each other a predetermined and equal distance. The electron beam is adapted to produce an illuminated spot that scans correspondingly in the raster pattern and wherein the spot is positioned in an object plane. The optical lens system for focusing in a diffraction limited manner, the object plane on to the sample plane, such that the image of the spot is the smallest diffraction limited size as determined by the optical lens system. The imaging system also includes zoom and contrast enhancement/suppression capabilities.

34 Claims, 3 Drawing Sheets

Modulation = (0.7597 − 0.2404)/1.0000 = 0.5195

*Figure 4.*

VARIABLE MAGNIFICATION COLOR SCANNING LIGHT MICROSCOPE

FIELD OF THE INVENTION

This invention relates generally to the field of imaging systems used in microscopy and more particularly to an electro-optical imaging device adapted to be used in combination with an optical system such as a conventional microscope that displays a real time, three-color, diffraction-limited, video image which can be used in transmission and reflection microscopy.

BACKGROUND OF THE INVENTION

It is known to apply video technology to the imaging of microscope samples. Video cameras, laser scanners, and flying spot scanners have all been applied to microscopy.

For example, flying spot scanners based on cathode ray tube (CRT) technology were applied to microscopes in the mid 1950's, and the "Hematrak", made by Geometric Data Corporation, was produced from the mid 1970's until the mid 1980's for the specific task of automating the testing of blood slides in hospitals. The system used a single optical magnification and operated at or below standard broadcast television resolution, which is approximately 450×350 pixels of information in the field of view.

While the Hematrak generally operated well enough to examine blood cells, its lack of utility as a microscope having general application caused it to fall into disuse. Furthermore, it operated at a single fixed magnification and was an expensive device.

It is accordingly an object of the present invention to provide a scanning imaging system that produces an output for display on a video display terminal.

Another object of the present invention is to provide a scanning imaging system that operates at the diffraction limit of the optics to which it is connected and is therefore an imaging system operating at the uppermost limits of resolution.

Yet another object of the present invention is to provide a scanning imaging system that operates at a variety of magnification powers.

Still another object of the present invention is to provide a scanning imaging system that includes the ability to enhance or suppress portions of the field of view.

A still further object of the present invention is to provide a scanning imaging system that include a magnification zoom feature.

A still further object of the present invention is to provide a scanning imaging system that is reliable and inexpensive.

SUMMARY OF THE INVENTION

The benefits and advantages of the present invention are achieved in an imaging system characterized by its ability to produce a diffraction limited output signal representative of a sample positioned on a sample plane. The imaging system comprises a cathode ray tube, an optical lens system and a means for sensing. The cathode ray tube comprises a spot scanner means for generating an illuminated spot that scans in a raster pattern. The raster pattern is composed of a predetermined number of horizontal lines that are spaced vertically from each other a predetermined and equal distance. An illuminated spot scans correspondingly in the raster pattern and wherein the spot is positioned in an object plane. The system images in a diffraction limited manner, the object plane on to the sample plane, such that the image of the spot is the smallest diffraction limited size as determined by the optical lens system.

BRIEF DESCRIPTION OF THE DRAWINGS

Some of the features and advantages of the present invention having been briefly stated, others will appear from the detailed description which follows, when taken in connection with the accompanying drawings—

DETAILED DESCRIPTION OF THE ILLUSTRATED EMBODIMENTS

While the present invention will be described more fully hereinafter with reference to the accompanying drawings in which particular embodiments are shown, it is to be understood at the outset that persons skilled in the art may modify the invention herein described while still achieving the favorable results of this invention. Accordingly, the description which follows is to be understood as a broad teaching disclosure directed to persons of skill in the appropriate arts and not as limiting upon the present invention.

Figure 1A:
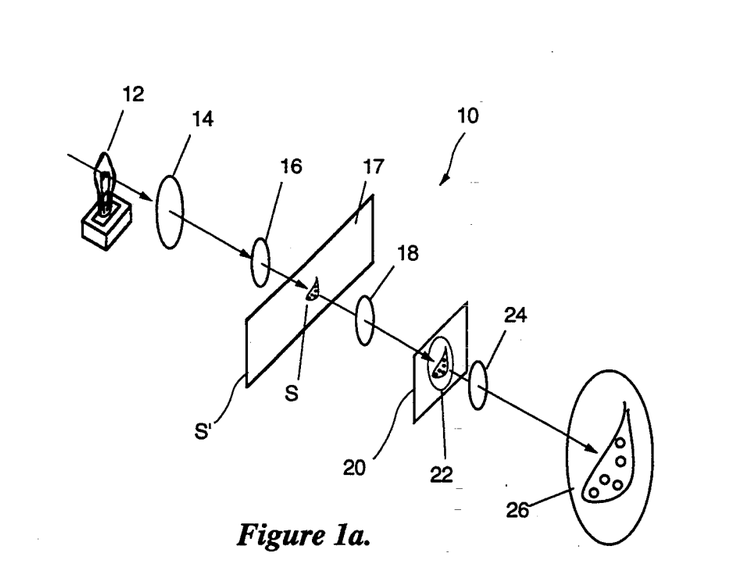
FIG. 1a illustrates schematically a conventional optical imaging system, such as a compound microscope.

In order for the reader to more fully understand the present invention it will be instructive to define certain terms with reference to the optical diagram of a conventional compound microscope as shown in FIG. 1a. Whenever possible, like reference numerals will be employed when referring to a conventional microscope and the imaging system according to the present invention which may employ such a microscope as part of the system.

In a conventional microscope generally indicated at 10, the lamp or bulb 12 illuminates the sample S on the glass slide S' lying in a slide plane 17 through relay and condenser lenses 14 and 16, respectively. An objective lens 18 creates an intermediate image of the sample S in the intermediate image plane 20. The diameter of the field stop 22, located in this plane, defines the field of view (FOV) surrounding the sample image. An eyepiece lens 24 creates a projected image of the sample S either in the eye, or directly onto a projection image plane 26, typically 25 cm from the eyepiece lens 24. According to the reciprocity rules of optical systems, an object placed in the projection image plane 26 will be imaged backwards through the optics onto the slide plane 17 with the lens magnification factors reversed.

Figure 1B:
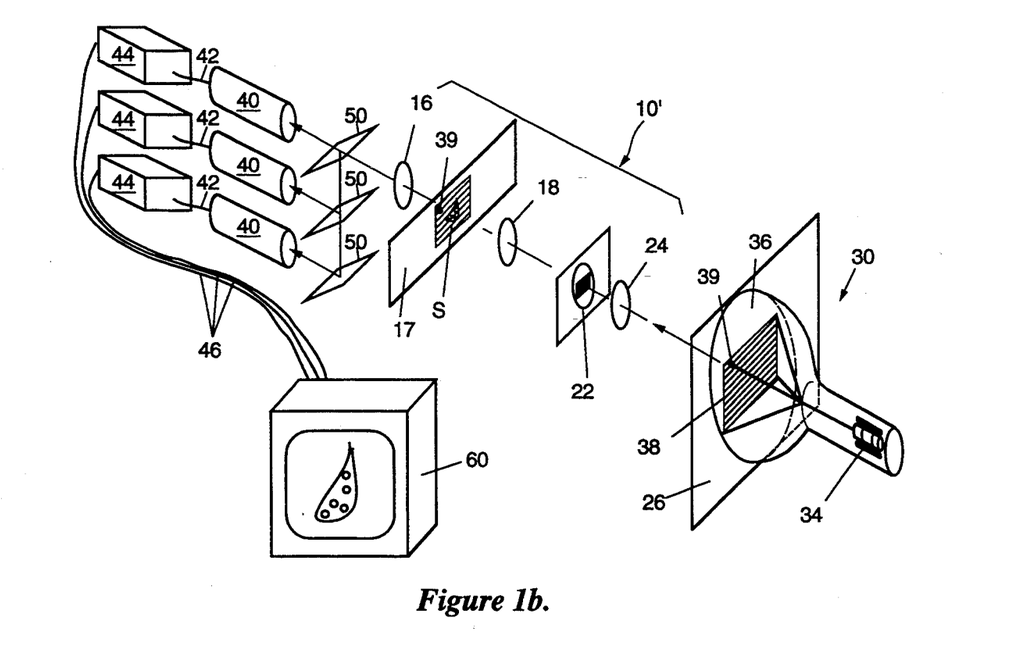
FIG. 1b illustrates schematically an imaging system according to the present invention.

Referring now to FIG. 1b, the imaging system according to the present invention is there illustrated and comprises generally a means for imaging such as an optical system 10', a spot scanner means generally indicated at 30 and means for sensing 40. In a further embodiment of the invention the electrical output signal is output to a video display device 60.

Figure 2:
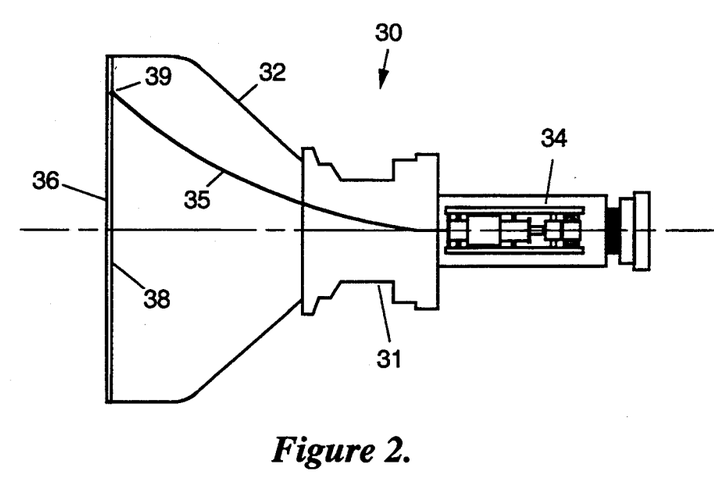
FIG. 2 illustrates schematically a cathode ray tube (CRT) according to the present invention.

Referring now to FIG. 2, the spot scanner means takes the form of a conventional cathode ray tube (CRT) 30. The CRT includes a glass envelope 32 with a means for generating an electron beam or electron gun 34 is positioned at one end and a substantially flat screen 36 that is coated with phosphor 38 which is positioned at the opposite end. Individual phosphor spots 39 are excited as an electron beam 35 sweeps in a raster pattern across the screen 36. The deflection system 31 is adapted to scan in a raster pattern which comprises a predetermined number of horizontal lines spaced vertically from each other a predetermined and equal distance. The electron beam 35 is adapted to sequentially excite the phosphor 38 on the screen 36 in order to produce an illuminated spot 39 in the object plane 26 of FIG. 1b that scans correspondingly in the raster pattern. For a detailed description of the operation of a CRT 30 the reader is referred to any one of the numerous texts on the topic. Furthermore, the means for generating the spot 39 may also comprise an electron beam such as is found in electron microscopes, or a laser beam such as found in laser scanning microscopes.

The imaging system 10' also includes an optical lens means or optical lens system 18,22,24 for focusing in a diffraction limited manner, the object plane 26 on to a sample plane 17 such that the image of the spot 39 is the smallest diffraction limited size as determined by the optical lens system 10'. As used herein, the term sample plane is defined as the sample lying in the image plane. In its simplest form, the optical lens system 10' substantially resembles the conventional optical microscope 10 of FIG. 1a without the lamp 12 and relay lens 14.

Also included in the imaging system of the present invention is a means 40 for sensing the interaction of the spot 39 with a corresponding location on the sample S and for producing a modulated output signal proportional thereto. The means 40 generally comprises one or more photomultiplier tubes, depending on the number of colors to be output.

Referring again to FIG. 1b, according to the imaging system of the present invention if a CRT screen 36 is placed in the object plane 26, the image of the scanning spot 39 is demagnified through the eyepiece lens 24 and the objective lens 18 and is focussed onto the slide S' so as to trace over the sample S. The light transmitted through the sample S is collected by lens 16 and is directed through one of color filters 50 and the filtered light is input to the respective three photomultiplier tubes (PMTs) 40. The PMTs output electrical signals on lines 42 are then input to signal amplifiers 44. The amplifier signals are input by lines 46 to each of the red, green and blue inputs of a color display monitor 60 thereby recreating the image of the scanned portion of sample S on the display monitor 60. Note that while the foregoing discussion is directed to operating the imaging system in combination with a transmission microscope, the imaging system can be operated in combination with a reflection microscope with little modification, well known to those skilled in the art. In addition, the number of color detector channels may be any reasonable value and the imaging system may also be operated as a black and white model using one PMT 40 and without the color filters 50, if a particular application so requires.

It has been emphasized herein that the imaging system according to the present invention operates at the diffraction limit of the optics (or more particularly the microscope) to which it is attached. It is believed by the applicant that heretofore no such imaging system has been devised. By operating at the diffraction limit advantages occur, namely resolution is significantly enhanced. In addition, the imaging system of the present invention has the ability to zoom in on the sample and to enhance or suppress the output signal in order to modify the detectability of a portion of the sample. With the foregoing in mind, the discussion which follows the reader will come to understand the physical parameters of the present imaging system.

Relationship between the CRT spot and raster size, and microscope optical components In order to achieve diffraction-limited resolution of spot 39 (FIG. 1b), the CRT spot radius is determined by the diffraction limit of the optics. The scanned field size is determined by the diameter of the field stop 22 in the intermediate image plane 20. Table 1 shows the diffraction-limited spot sizes in the three image planes of a conventional microscope for a typical selection of objective powers 18. Column (8) is the number of diffraction-limited picture elements across the field of view.

TABLE 1

| The Optical Specifications of a Conventional Microscope | | | | | | | |
|---|---|---|---|---|---|---|---|
| (1) FOV (mm) | (2) Eyep. Mag. | (3) Obj. Mag. | (4) Obj. NA | (5) $R_0$ (μm) | (6) $R_1$ (μm) | (7) $R_2$ (μm) | (8) Elem FOV |
| 20 | 10 | 10 | 0.30 | 1.12 | 11.18 | 111.8 | 1785 |
| | | 40 | 0.75 | 0.45 | 17.89 | 178.9 | 1118 |
| | | 100 | 1.30 | 0.26 | 25.81 | 258.1 | 775 |

$R_0$ is the radius of the smallest resolvable element in the slide plane 17 (FIG. 1b) calculated from the Rayleigh resolution criterion.

(1) $R_0 = 0.61 \lambda / NA$, where $\lambda = 550$ nm is the chosen wavelength representing the center of the visible spectrum, and NA is the numerical aperture of the objective lens 18.

The radius of the image of $R_0$ in the intermediate image plane 20 between the objective 18 and the eyepiece lens 24 is (2) $R_1 = R_0 \times Mag_{obj}$.

In the intermediate image plane 20, the field stop 22 defines the diameter of the field of view for the whole system, $F_1 = FOV = 20$ mm in this example. The radius of the image of $R_1$ in the projection image plane 26 is (3) $R_2 = R_1 \times Mag_{eye}$.

At the location of the projection image plane 26, a real image can be shown on a screen. The diameter of the field of view in the projected image plane is (4) $F_2 = F_1 \times Mag_{eye}$, and the diameter of the field of view in the slide plane 17 is $$F_0 = \frac{F_1}{Mag_{eye}}. \quad (5)$$

While this discussion refers specifically to a microscope having a fixed eyelens power and a fixed intermediate image plane field stop size, such conventions are artificial, and not meant to be limiting on the present invention.

The number of resolved elements across the field of view for each objective lens 18, shown in column (8) is $$N = \frac{F_0}{R_0} = \frac{FOV}{R_1} = \frac{F_2}{R_2}. \quad (6)$$

N is therefore a function of the numerical aperture of the objective lens 18 and the diameter of the field stop in the intermediate image plane 20.

From the table, the maximum number of resolved elements is 1785, which occurs for the lowest magnification option. The smallest point radius in the projected image plane is $R_2 = 111.8$ mm from column (7), which also occurs for the lowest magnification option. The projected image field diameter is $F_2 = 20$ cm from equation (4), and is constant for all objective magnification options.

In order to insure diffraction-limited resolution for all optical powers, the scanner CRT 30 must produce a spot radius less than or equal to the smallest value of $R_2$ in the table. In order to match the field of view of the microscope, the scan area on the CRT 30 must be comparable to $F_2$. Since video scanning patterns 12 have a rectangular shape (raster scan) and a typical microscope field of view is circular, the diagonal of the scanned pattern should match the circle diameter, $F_2$. The eyepiece field stop 22 could also be fabricated in a rectangular shape to match the CRT scanned pattern. A random scanning pattern could also be employed for tracing edges of samples and other specialized functions, but the basic geometrical-optical relationships for diffraction-limited resolution and full field display remain the same. It will therefore be noted that the aspect ratios of the scan patterns on the CRT 30 and the display monitor 60 must be the same, whether 4:5, 3:4, 1:1, or any other desired value.

Relationship between phosphor decay time and raster scan rates

A common manner of determining the contrast of an optical system such as system 10' is to use a sample consisting of a field of parallel black and white bars of the same width. Theoretically, the black bars have 0% transmission, and white (or clear) bars have 100% transmission. As the spot is traced perpendicular to the bars, the modulation of the transmitted light signal may be determined from the formula $$\text{Modulation} = \frac{\text{max signal} - \text{min signal}}{\text{max signal} + \text{min signal}}, \quad (7)$$

which is also referred to as the image contrast The reader is referred to classical texts, such as Chapter 11 of Modern Optical Engineering, McGraw Hill, 1966, by Warren Smith. The signal modulation is measured for decreasing bar widths and a graph of the modulation vs bar width, or resolution, can be drawn. For this example, the modulation for a diffraction-limited spot tracing a diffraction-limited bar width is desired. The modulation for these conditions is a function of the scan speed and the phosphor decay characteristics. The relationship will now be derived.

All CRT phosphors exhibit a decrease in intensity after excitation by the electron beam 35. The decay period is normally defined as the time interval in which the phosphor intensity decreases to 10% of the initial intensity. Occasionally, a 1% phosphor intensity is used to define decay time. Decay times and decay curve shapes vary widely between phosphor types and operating conditions. Mathematical representations of decay curves include exponential and power law formulas, but are generally not known. Usually, measured curves are the only representations available.

A specific relationship exists between the scan rate of the flying spot 39 and the contrast of the image. The scan rate determines the PIXEL DWELL TIME, or the residence time of the optical spot over a single resolution element. The word pixel usually means a "picture element", but as used here means a "diffraction-limited picture element", whose dimension is defined in eq. (1). If the spot 39 scans rapidly across the screen 36 so that the pixel dwell time is much shorter than the phosphor decay time, then previous resolution elements will continue emitting light after the electron beam 35 has passed. The result is a reduction in contrast of the signal.

Figure 3:
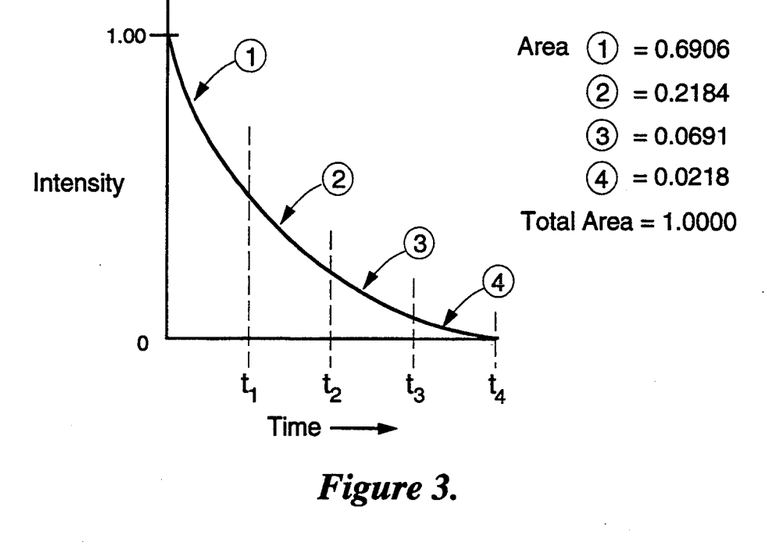
FIG. 3 illustrates a normalized phosphor decay curve showing brightness versus time.
Figure 4:
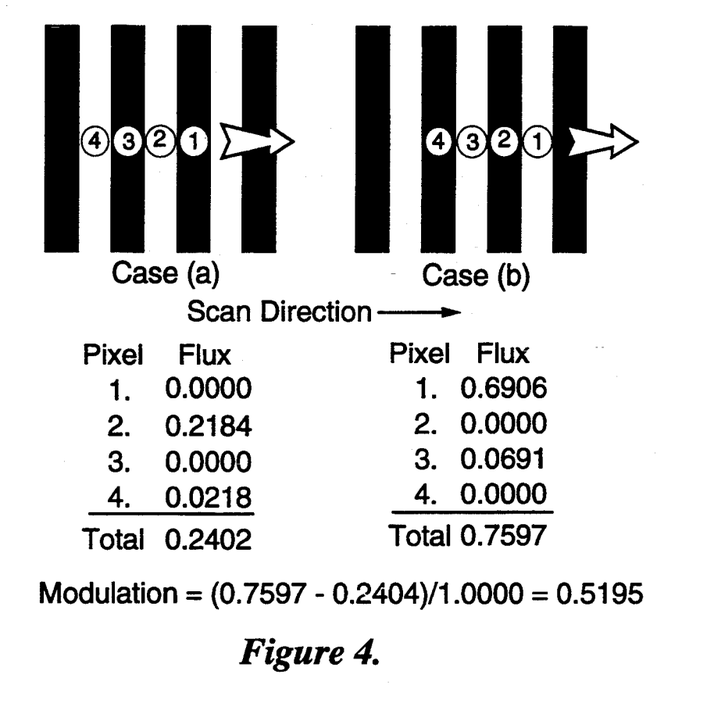
FIG. 4 illustrates the maximum and minimum signal states of a diffraction limited spot according to the present invention.

The effects can be illustrated by FIGS. 3 and 4. FIG. 3 represents a normalized phosphor decay curve showing brightness versus time. Let us choose the pixel dwell time as ¼ of the total decay time and divide the curve into four equal time zones. The area in each zone is shown in the table at right and represents the total light flux emitted during that time interval. FIG. 4, case a shows successive positions of the light spot during the four time zones as it scans over a set of parallel black and white bars whose width is the diffraction limit of the optics. Each spot position represents one pixel dwell time. FIG. 4, case b shows case a one pixel dwell time later. Case a and case b represent the maximum and minimum signal states of the position of a scanning spot tracing over .the bars for the given pixel dwell time. The illumination of pixels 1, 2, 3, and 4 will be fractions of the decay curve as shown. The total light transmitted through the sample will be the sum of the light flux illuminating each pixel times the transmissivity of each pixel, which was defined as either black (0% transmission), or white (100% transmission).

For this example, the image modulation, or contrast, that follows from the two states is 0.5195, or 51.95%. Any pixel dwell time could be used in the example, and the procedure repeated to determine the resulting contrast. It is common practice in the design of optical imaging systems to specify that the image modulation shall be greater than 50% at the specified resolution. Design values down to 30% may be adequate. The limit of visual detection occurs at image modulation values in the range of 2–3.5%.

The direct interaction between the scanning spot 39 and the sample S is the only interaction that relates the phosphor decay time to the spot dwell time. More sophisticated calculation methods may be employed, but adequate values can be achieved with this simple method. The contrast is also affected by scattering or other effects away from the sample S.

The horizontal and vertical scan times of the raster on the CRT 30 are determined from the spot dwell time. The horizontal scan period is (8) $T_h = t \times N_h + t_h$, where t = pixel dwell time, $N_h$ = number of horizontal pixels,
and $t_h$ = horizontal flyback and blanking time.
The horizontal scan frequency is then (9) $W_h = T_h^{-1}$.

The vertical scan period is (10) $T_V = T_h \times N_V + t_V$, where $T_h$ = horizontal scan period from eq. (8),
$N_V$ = number of vertical pixels
$t_V$ = vertical flyback and blanking time.
The vertical scan frequency is then (11) $W_V = T_V^{-1}$.

At this point, the following parameters have been defined: the phosphor spot size that will yield a diffraction-limited spot 39 on the sample plane 17 for all objective powers; the scan rates that will yield a predetermined contrast for a diffraction-limited pixel; and a scan raster size that will illuminate a full field of view.

Frequency response of the detector circuits

The next component of the imaging system requires the conversion of optical information into electronic information. The procedures above insure that the pixel data is being generated at maximum resolution with good contrast.

In order to preserve the resolution, the frequency response of the means for sensing or PMTs 40 must match or exceed the inverse pixel dwell time. Electronic circuit frequency response is usually stated in terms of a graph of frequency vs modulation in a manner very similar to the optical modulation/contrast definition given above. Typical specifications give the frequency response at 3 db roll-off, or 50% modulation. If the optical modulation at the slide is 50%, and the electrical amplifier modulation is 50%, the resultant signal has a modulation of 25%, which would approach a design minimum. The frequency response could be specified at 1 db (79%), or 0 db roll-off for better modulation. The reader will note that PMTs are well known in the art and therefore it is not necessary to describe specific PMTs or amplifier circuits, but rather to describe the conditions for the proper operation thereof in the particular image system of the present invention. Frequency bandwidths of 20 Mhz and up are typical, exceeding the 3.75 Mhz bandwidth of ordinary television standards by a significant amount. According to the conditions outlined above, standard television scan rates and amplifier bandwidths cannot approach the diffraction-limited requirements of an conventional microscope image.

Resolution and contrast of the display monitor

The signals from the PMT amplifiers 44 on lines 46 contain all the information available from the imaging system. The amplified output signals can be displayed directly on a visual display device such as a video monitor 60, or digitized and output to a digital processing device or other permanent storage media for later display, analysis, or telecommunication. The specifications of the display monitor 60 determine the final visual quality of the image. If the monitor 60 can display the number of color pixels contained in the signal from the video amplifiers 44, then the resolution and the field of view of the ordinary microscope image can be reproduced. The monitor's video amplifier bandwidth and phosphor characteristics will determine the monitor's resolution and contrast, and hence its ability to faithfully represent the original electronic output signals from the microscope video amplifiers 44. For monitors with fewer pixels than contained in the video signal from the imaging system, a trade-off between field of view and resolution can be made, resulting in full resolution in a smaller field of view.

Zoom mode

The display screen of the monitor 60 represents a constant size window showing the contents of the scanned area on the slide. If the scanned area on the slide is made smaller, it is still displayed full size on the monitor 60, giving a magnification zoom effect. In other words, varying the size of the raster pattern on the spot scanning device causes the raster area on the sample to be correspondingly changed thereby causing a larger or smaller portion of the sample to be contained within the output signal providing a variable magnification to the display device or other digital processing device. When used with lower power objectives 18 that have a large number of pixels in the field of view, any area can be zoomed in magnification so that the display resolution matches the diffraction limit of the optics. For example, if there are 1700 pixels across the microscope image, and only 1200 pixels across the monitor screen, then the zoom feature can be used to shrink the raster down to cover only 1200 pixels on the sample so the resolution of the display 60 matches or exceeds the image resolution at the reduced field of view.

Another characteristic of the zoom feature is constant brightness or intensity in the image for any zoom magnification setting. The brightness of the raster on the scanner CRT 30 is given by the relation $$B_p = k \times \frac{I}{A}, \quad (12)$$

where I is the electron beam current, A is the area of the scanned raster, and k is a constant factor. The subscript p refers to the phosphor 38. Equation (12) is linear over a wide range of beam current settings. When the scanned area is reduced for constant beam current, the brightness increases in inverse proportion to the area change.

If the magnification of an optical system is changed, such as changing objective lenses 18 in a microscope, then the light passing through the lens system, and hence the brightness of the image is changed in direct proportion to the area change of the image. The brightness change can be represented by the relation (13) $B_1 = B_0 \times A$, where $B_0$ is the initial image brightness. If $B_0$ comes from a phosphor satisfying eqn. (12), then eqn. (13) becomes $$B_1 = \left[ k \times \frac{I}{A} \right] \times A = k \times I. \quad (14)$$

Equation (14) shows that a change in magnification due to changing the raster size has no effect on the brightness or intensity of the image. The variation in phosphor brightness or intensity exactly compensates for the variation in area. Since the mechanical system is not altered, the focus does not change. The zoom feature therefore produces a change in magnification with no change in the intensity of the output signal level and no change in focus.

Contrast enhancement or suppression by spot modulation

In all current scanning type microscopes, the spot brightness or intensity is constant as it travels over the sample S. Modulating the spot intensity as it scans across the sample plane as a function of image content can be a powerful tool for image detailing. Spot modulation requires that the scanner CRT 30 circuits include a video amplifier and driver capable of modulating the electron beam at a frequency bandwidth no less than the PMT amplifier circuits 44.

If the spot brightness is decreased as it traces over a dark object, the resultant signal will show an enhanced dark swing. The feature may eliminate in many applications the need for conventional microscope contrast enhancement accessories (such as "differential interference contrast", darkfield illumination, and other phase contrast components) while maintaining full image resolution. This mode is called contrast enhancement, or positive feedback, or normal signal mode.

Conversely, if the spot brighiness is increased as it traces over a dark object, the signal will show a reduced dark swing, or possibly no dark swing at all. This mode is called the contrast suppression, or negative feedback, or inverted signal mode. In the contrast suppression mode, portions of images can be made to disappear, or become much less prominent.

The signal used to modulate the scanner CRT 30 brightness is derived from the actual sample image signal from one or more of the PMT channels. The signal from a single channel may be used in either the normal or inverted mode, or several channels may be mixed and used in normal or inverted mode. In this manner, colored objects in the image may be selectively enhanced or suppressed.

For example, in the examination of a blood smear, the combination of colors for red blood cells could be fed into the scanner CRT video amplifier in a negative feedback mode to suppress or eliminate red blood cells from appearing in the image. This is not a data processing feature that works on the output image dam, but a feature that is operative during creation of the image. Any color channel, or combination of color channels could be combined and used as positive or negative feedback to the scanner CRT.

The foregoing spot intensity modulation technique can also be applied to laser and electron beam imaging systems.

An Example

To illustrate the previous description of the invention, a specific example will now be described.

a) CRT spot size and raster size. The information in Table 1 and surrounding equations describe a conventional microscope optical system. The information in that section defines the following:

smallest CRT spot size = 111.8 μm.
CRT raster size = 20 cm diagonal

The CRT envelope, gun structure, and high voltage are specified in combination to meet the specification. Many combinations are available to one skilled in the art. This example assumes a 3:4 raster aspect ratio.

b) Phosphor decay time and raster scan rate. The faster the phosphor decay time, the faster the scan rate. In general, a very fast phosphor is required for a scan rate fast enough to allow direct viewing on a video monitor. Phosphors in the P46 family have 1% decay times of approximately 100 ns. Assume the pixel dwell time is chosen to be ⅓ the phosphor decay time, or 33 ns. For a 1024×768 pixel monitor, the horizontal period from equation (8) is $$T_h = t \times N_h + t_h = 33 \text{ ns} \times 1024 + 6 \text{ }\mu s$$
$$= 39.8 \text{ }\mu s,$$

where the blanking and flyback time was chosen to be 6 μs. The horizontal frequency is 25 kHz. The vertical period from equation (10) is $$T_V = T_h \times N_V + t_V = 39.8 \text{ }\mu s \times 768 + 10 \text{ ms}$$
$$= 38.6 \text{ ms},$$

where the vertical blanking and flyback time is chosen as 10 ms. The vertical frequency is 25.9 Hz. In order to avoid objectionable flicker in a directly viewed image, a display monitor with long persistance phosphors may be required.

c) Video amplifier bandwidth. For a pixel dwell time of 33 ns, an amplifier bandwidth of 30.3 mHz±1 db is required. The video amplifiers in the display monitor must have at least the same bandwidth to maintain the resolution of the signal.

From table 1 it can be seen that the field of view and resolution on the display monitor match direct viewing in the conventional microscope above about 40× objective power. For the 10× objective, the image must be zoomed to approximately 1024/1785=57% of full field for the monitor to display the resolution of the optical system. At 100× objective power, the monitor can display more pixels than the optical system can resolve.

The foregoing embodiments and examples are to be considered illustrative, rather than restrictive of the present invention, and those modifications which come within the meaning and range of equivalence of the claims are to be included therein.

That which is claimed is:

1. An imaging system characterized by its ability to produce a diffraction limited output signal representative of a sample positioned on a sample plane and comprising:

(a) a spot scanner means comprising:
  means for generating an illuminated spot in the form of an essentially isotropic emitter adapted to scan in a raster pattern, said raster pattern comprising a field having a predetermined number of horizontal lines spaced vertically from each other a predetermined and equal distance, said spot being positioned in an object plane;

(b) means for imaging in a diffraction limited manner the object plane on to a sample plane, such that the image of said spot on the sample plane is the smallest spot size as defined by the diffraction limits of said imaging means;

(c) means for sensing the interaction of said spot with a corresponding location on the sample and for producing a resultant modulated output signal proportional thereto; and (d) wherein said object plane spot size is less than or equal to that which is necessary in order for the imaging means to produce the smallest diffraction limited spot size in the sample plane;

whereby a diffraction limited output signal representative of the sample plane is produced such that it may be displayed on a display device or output to a digital processing device.

2. An imaging system according to claim 1 wherein said means for generating a spot comprises a CRT further including means for generating an electron beam adapted to scan in said raster pattern, and a screen including phosphor, and wherein said electron beam is adapted to sequentially excite said phosphor so as to produce said illuminated spot that scans correspondingly in said raster pattern.

3. An imaging system according to claim 1 wherein said means for imaging an illuminated spot comprise optical lenses.

4. An imaging system according to claim 2 wherein said sample plane comprises a predetermined number of pixels, each of said pixels having a diameter equal to the diffraction limit of said means for imaging, and wherein the scan rate of said illuminated spot is defined by the decay time of said phosphor according to the following relationships:

the dwell time of said illuminated spot over a single diffraction limited pixel diameter is at least 1/10 of the decay time of said phosphor as measured from full intensity to 1% intensity, and wherein the time required to scan a single horizontal line is equal to the number of pixels in said horizontal line multiplied by the dwell time plus the time required to retrace the spot from the last pixel of the last line to the first pixel of the following line;

wherein the time required to scan vertically said field is equal to the horizontal scan time multiplied by the number of vertical pixels plus the time required to retrace the spot from the last pixel of the last line to the first pixel of the first line.

5. The imaging system according to claim 1 wherein the means for sensing has a frequency response of at least the reciprocal pixel dwell time with less than 1 db of reduction in said output signal modulation from the maximum frequency response.

6. An imaging system according to claim 1 wherein the intensity of said illuminated spot is modulated as it scans across the sample plane so as to modify the signal variation caused by a sample, whereby the output signal is enhanced or suppressed as required in order to modify the detectability of a portion of the sample.

7. An imaging device according to claim 1 wherein said output signal is input into an amplifier to produce an amplified output signal suitable for further processing.

8. An imaging system according to claim 7 wherein said amplified output signal is output to a visual display device.

9. An imaging system according to claim 7 wherein said amplified output signal is output to a digital processing device.

10. An imaging system according to claim 1 wherein said means for sensing comprises a photomultiplier tube.

11. An imaging system according to claim 2 wherein said apparatus further includes a zoom means for varying the size of said raster pattern on said cathode ray tube;

whereby the raster area on the sample is correspondingly changed thereby causing a larger or smaller portion of the sample to be contained within said output signal providing a variable magnification to a display device or other digital processing device, and wherein the output signal level remains constant and the optical focus conditions of the imaging system remain constant resulting in a variable magnification image having constant brightness and focus.

12. An imaging system according to claim 1 wherein said means for sensing comprise a plurality of photomultiplier means, each of said photomultiplier tubes having an input for sensing the interaction of said spot with the sample and for producing respective modulated output signals proportional thereto; and a color filter means corresponding to each photomultiplier means positioned between the sample plane and the corresponding photomultiplier means input.

13. An imaging system according to claim 12 wherein said photomultiplier means comprise three photomultiplier tubes and, wherein said color filter means comprise red, green, and blue color filters.

14. An imaging system characterized by its ability to produce a diffraction limited output signal representative of a sample positioned in a sample plane of a conventional optical lens system wherein an object plane is focused on to an image plane and comprising:

a) a cathode ray tube comprising:

means for generating an electron beam adapted to scan in a raster pattern, said raster pattern comprising a field having a predetermined number of horizontal lines spaced vertically from each other a predetermined and equal distance, a screen including phosphor, and said electron beam being adapted to sequentially excite the phosphor so as to produce an illuminated spot in the form of an essentially isotropic emitter than scans correspondingly in said raster pattern, said spot being positioned in an object plane and wherein said spot size is less than or equal to that which is necessary in order for the optical lens system to produce the smallest diffraction limited spot size on the image plane so that when said spot is imaged on the sample, the smallest diameter spot permitted by the diffraction limits of the optical lens system is produced in the sample plane;

b) means for sensing the interaction of said spot with a corresponding location on the sample and for producing a resultant modulated output signal proportional thereto;

whereby a diffraction limited output signal representative of the sample plane is produced such that it may be displayed on a display device or output to a digital processing device.

15. An imaging system according to claim 14 wherein the sample plane comprises a predetermined number of pixels, each of said pixels having a diameter equal to the diffraction limit of the optical lens system, and wherein the scan rate of said illuminated spot is defined by the decay time of the phosphor according to the following relationships:

the dwell time of said illuminated spot over a single diffraction limited pixel is at least 1/10 of the delay time of said phosphor as measured from full intensity to 1% intensity, and wherein the time required to scan a single horizontal line is equal to the number of pixels in said horizontal line multiplied by the dwell time plus the time required to retrace the spot from the last pixel of the last line to the first pixel of the following line; and wherein the time required to scan vertically the field is equal to the horizontal scan time multiplied by the number of vertical pixels plus the time required to retrace the spot from the last pixel of the last line to the first pixel of the first line.

16. The imaging system according to claim 14 wherein the means for sensing has a frequency response of at least the reciprocal pixel dwell time with less than 1 db of reduction in said output signal modulation from the maximum frequency response.

17. The imaging system according to claim 14 wherein the intensity of said illuminated spot is modulated as it scans across the sample plane so as to modify the signal variation caused by a sample, whereby the output signal is enhanced or suppressed as required in order to modify the detectability of a portion of the sample.

18. An imaging device according to claim 14 wherein said output signal is input into an amplifier to produce an amplified output signal suitable for further processing.

19. An imagining system according to claim 18 wherein said amplified output signal is output to a visual display device.

20. An imaging system according to claim 18 wherein said amplified output signal is output to a digital processing device.

21. An imaging system according to claim 14 wherein said means for sensing comprises a photomultiplier tube.

22. An imaging system according to claim 12 wherein said imaging system further includes a zoom means for varying the size of said raster pattern on said cathode ray tube;

whereby the raster area on the sample is correspondingly changed thereby causing a larger or smaller portion of the sample to be contained within said output signal providing a variable magnification to a display device or digital processing device, and wherein the output signal level remains constant and the optical focus conditions of the imaging system remain constant resulting in a variable magnification image having constant brightness and focus.

23. A method of imaging a sample lying in a sample plane and comprising the steps of:

a) generating an illuminated spot in the form of an isotropic emitter of a size less than or equal to that which is necessary for an imaging system to produce the smallest diffraction limited spot size in the sample plane;

b) scanning the illuminated spot in a raster pattern;

c) directing the scanned illuminated spot through an imaging system in a diffraction limited manner so that the image of the spot in the sample plane is the smallest size as defined by the diffraction limits of the imaging system;

d) sensing the interaction of the spot with the corresponding location on the sample and producing a modulated output signal proportional thereto;

whereby a diffraction limited output signal representative of the sample plane is produced.

24. The method according to claim 23 wherein the step generating an illuminated spot further includes generating and electron beam by activating an electron gun in a cathode ray tube and exciting the phosphor in the cathode ray tube in order to produce the illuminated spot that scans correspondingly in the raster pattern.

25. The method according to claim 23 wherein the step of scanning further includes providing a sample plane having a predetermined number of pixels, each of the pixels having a diameter equal to the diffraction limit of the optical lens system, and wherein the scan rate of the illuminated spot is defined by the decay time according to the following relationships:

the dwell time of the illuminated spot over a single diffraction limited pixel is at least 1/10 of the delay time of the phosphor as measured from full intensity to 1% intensity; and wherein the time required to scan a single horizontal line is equal to the number of pixels in the horizontal line multiplied by the dwell time plus the time required to retrace the spot from the last pixel of the last line to the first pixel of the following line;

wherein the time required to scan vertically the field is equal to the horizontal scan time multiplied by the number of vertical pixels plus the time required to retrace the spot from the last pixel of the last line to the first pixel of the first line.

26. The method according to claim 23 wherein the step of sensing of the interaction of the spot with the corresponding sample location further includes a frequency response of at least the reciprocal pixel dwell time with less than 1 db of reduction in the output signal modulation from the maximum frequency response.

27. The method according to claim 23 further including the step of varying the intensity of the illuminated spot as it scans across the sample plane so as to modify the signal variations caused by the sample, so that the output signal is enhanced or suppressed as required in order to modify the detectability of a portion of the sample.

28. The method according to claim 23 further including the step of amplifying the modulated output signal in order to produce an amplified output signal suitable for further processing.

29. The method according to claim 28 wherein the amplified output signal is output to a visual display device.

30. The method according to claim 28 wherein the amplified output signal is output to a digital processing device.

31. The method of claim 23 wherein the step of sensing includes providing a photomultiplier tube that senses the interaction of the spot with the corresponding location on the sample and that produces a modulated output signal proportional thereto.

32. The method according to claim 23 further including the step of:

varying the size of the raster pattern so that the raster area on the sample is correspondingly changed thereby causing a larger or smaller portion of the sample to be contained within the output signal providing a variable magnification to a display device or other digital processing device, and wherein the output signal level remains constant and the optical focus conditions of the imaging system remain constant resulting in a variable magnification image having constant brightness and focus.

33. The method according to claim 24 further including the step of:
directing the modulated output signal through a series of color filters; and
splitting the modulated output signal into a number of separate components equal to the number of filters to produce a corresponding number of filtered modulated output signals; and
inputting each of the filtered modulated output signals into a corresponding detector tube; and
outputting an electrical signal from each detector tube proportional to the amplitude of the respective filtered modulated output signal.

34. The method according to claim 33 comprising the step of filtering includes passing the modulated output signal through red, green, and blue filters.

* * * * *